United States Patent Office 3,347,945
Patented Oct. 17, 1967

3,347,945
HYDRODIMERIZATION OF BENZENE
Lynn H. Slaugh, Lafayette, Calif., assignor to Shell Oil Company, New York, N.Y., a corporation of Delaware
No Drawing. Filed Oct. 21, 1965, Ser. No. 500,246
6 Claims. (Cl. 260—668)

This invention relates to an improved method for the hydrodimerization of benzene.

Methods are available in the art for the coupling of aromatic nuclei in the presence of molecular hydrogen to produce an at least partially hydrogenated dimer derivative of the aromatic reactant. For example, benezene is hydrodimerized at high temperature to a mixture containing phenylcyclohexane in the presence of unsupported alkali metals, and naphthalene is hydrodimerized to yield a mixture of products including binaphthyl and dimers of tetrahydronaphthalene. Additionally, Logeman, U.S. 3,153,678 issued Oct. 20, 1964, discloses a process for the hydrodimerization of aromatic hydrocarbons to produce cycloalkyl-aryl dimer derivatives by contacting the aromatic hydrocarbon with molecular hydrogen in the presence of a heteropoly acid.

It is an object of the present invention to provide an improved process for the hydrodimerization of benzene. More particularly it is an object to provide an improved process for the production of phenylcyclohexane by the hydrodimerization of benzene.

It has now been found that these objects are accomplished by contacting benzene with molecular hydrogen in the presence of certain supported alkali metal catalysts. The process results in the formation of a partially-hydrogenated dimer derivative of benzene, i.e., phenylcyclohexane, and thus is termed a process of hydrodimerization. In the process of the invention, proper selection of the alkali metal catalysts as well as the catalysts has been found to be critical, as utilization of closely related alkali metals and/or supports does not provide satisfactory results.

The alkali metal catalyst comprises at least one member of Group I-A of the Periodic Table having an atomic number from 19 to 55 inclusive, that is, potassium, rubidium or cesium, or mixtures thereof. Although the remaining members of Group I-A, i.e., sodium or lithium, may be satisfactorily employed in conjunction with at least one Group I-A metal of atomic number from 19 to 55 inclusive, as in the case of a sodium-potassium alloy, the use of sodium and/or lithium alone does not provide satisfactory results, the yield of phenylcyclohexane product and/or the conversion of the benzene reactant being undesirably low. The preferred alkali metal catalyst substantially comprises a single Group I-A metal of atomic number from 19 to 55 inclusive and particularly preferred as the alkali metal to be employed in the process of the invention is potassium.

The ratio of alkali metal catalyst to benzene reactant is not critical. In general molar ratios of benzene to alkali metal from about 20:1 to about 2:1 are satisfactory with molar ratios of benzene to alkali metal of from about 10:1 to about 4:1 being preferred.

The alkali metal is employed as a supported catalyst where in the support is selected from calcined alumina and activated carbon. Rather unexpectedly, other conventional support materials, e.g., silica, magnesia, silica-alumina, potassium carbonate and the like, are not useful in the present process. In the modification of the process wherein the catalyst support is calcined alumina, aluminas of varying type have been found to be useful. Best results are obtained when the support has been pretreated, as by washing with a solution of ammonium ions or ions of the alkali metal catalyst to be employed. Good results are also obtained when the alumina is employed in a relatively high state of purity, as by preparing the alumina by precipitation from a solution of a soluble aluminum salt followed by drying and calcining. However, as previously stated, no pretreatment of the alumina support is required and many commercial grades of alumina are suitably employed without prior treatment other than calcination. In an alternate modification of the process of the invention, the catalyst support is activated carbon. By the term "activated carbon" is meant a powdered or granulated form of carbon typically prepared by carbonization of carbonaceous materials, e.g., wood or coconut shells.

The ratio of the alkali metal catalyst to the catalyst support is not critical, and supported catalysts of a weight ratio of alumina or activated carbon support to alkali metal of from about 20:1 to about 2:1 are satisfactory. Preferred supported catalysts are of a weight ratio of support to alkali metal of from about 10:1 to about 3:1.

The supported catalysts is prepared by any convenient method. In one modification, the supported catalyst is preformed as by mixing the alkali metal in a molten state with the support, which mixing is conducted in an inert environment. The preformed supported catalyst thereby produced is added directly to the reaction mixture. Largely for reasons of convenience, however, it is preferred to form the supported catalyst in situ as by introducing into the reaction mixture calculated quantities of the desired alkali metal catalyst and the catalyst support. During the initial stages of the hydrodimerization process, its is considered that the alkali metal, normally molten under reaction conditions, becomes absorbed on the surface of the support, thereby forming the supported catalyst.

In the process of the invention benzene in the liquid phase is contacted with molecular hydrogen in the presence of the supported alkali metal catalyst at an elevated temperature and pressure. While the optimum reaction temperature will in part depend upon the particular alkali metal catalyst and catalyst support employed, temperatures of from about 100° C. to about 250° C. are generally satisfactory with temperatures of from about 150° C. to about 225° C. being preferred. In determining the optimum reaction pressure, it should be appreciated that any normally liquid components of the reaction mixture will exert a vapor pressure at the temperature at which the reaction is conducted, which vapor pressure may be substantial. The reaction pressure is therefore suitably measured in terms of the hydrogen pressure within the reaction system. In general, hydrodimerization of benzene to phenylcyclohexane is favored by comparatively low hydrogen pressures and pressures of from about 50 p.s.i.g. to about 1500 p.s.i.g. are satisfactory. Best results are obtained, however, when a hydrogen pressure of from about 100 p.s.i.g. to about 900 p.s.i.g. is employed.

The reaction is conducted in the presence of or in the substantial absence of added reaction solvents or diluents. In the modification wherein added solvent is employed, solvents which are liquid at reaction temperature and pressure and are inert to the catalysts, reactants and reaction products are suitably employed. Preferred solvents to be utilized in this modification are saturated hydrocarbons of from 6 to 16 carbon atoms, e.g., acyclic alkanes such as hexane, decane, octane, dodecane and hexadecane as well as cycloalkanes such as cyclohexane, cyclooctane, cyclododecane and decahydronaphthalene. In similar fashion, the process is operable in the presence of inert gaseous diluents such as nitrogen, argon, helium, methane and the like. In the preferred modification of the process, however, the reaction is conducted in the substantial absence of added diluent or solvent.

The process is adaptable for batchwise or continuous operation. In a batchwise procedure, the benzene reactant and supported catalyst, or alternatively the catalyst components, are charged to an autoclave or similar pressure reactor which is pressurized with hydrogen and maintained at reaction temperature. In an alternate modification, the process is conducted in a continuous manner as by contacting the benzene reactant with molecular hydrogen while flowing through a tubular reactor wherein the supported catalyst is maintained. By either modification, the efficient hydrodimerization of benzene to phenylcyclohexane is effected. Subsequent to reaction, the product mixture is separated and the phenylcyclohexane product is recovered by conventional methods as by fractional distillation, selective extraction, fractional crystallization or the like.

The product of the process of the invention is phenylcyclohexane produced by hydrodimerization of the benzene reactant. Although in all cases a proportion of cyclohexane is also observed, under the conditions of the present process a comparatively high degree of selectivity to phenylcyclohexane is obtained. The phenylcyclohexane product is useful in a number of applications as a solvent and as a chemical intermediate. A particular application resides in the conversion of phenylcyclohexane to phenol and cyclohexanone, an established intermediate in the production of polyamides. According to the process of British Patent No. 681,613 issued October 29, 1952, to McCall et al., phenylcyclohexane is oxidized with gaseous oxygen or the like to 1-phenylcyclohexanehydroperoxide which is subsequently treated with dilute surfuric acid to produce a mixture of phenol and cyclohexanone.

To further illustrate the improved process of the invention the following examples are provided. It should be understood that the details thereof are not to be regarded as limitations as they may be varied as will be understood by one skilled in this art.

Example I

A series of runs was conducted employing various alkali metal catalysts in conjunction with an alumina support which had been calcined at 550° C. The indicated amounts of benzene, alkali and alumina support were charged to an autoclave which was pressurized with hydrogen and maintained at the indicated reaction conditions. The product mixture was separated from the supported catalyst by filtration and analyzed by gas-liquid chromatography. The results of this series are shown in Table I wherein the term "conversion" indicates the percentage of benzene converted to products and the term "selectivity" indicates the yield of phenylcyclohexane based on benzene converted.

TABLE I

| Metal, millimoles | Support, g. | Benzene, millimoles | Temp., °C. | Max $H_2$ Press., p.s.i.g. | Time, hrs. | Conversion | Selectivity |
|---|---|---|---|---|---|---|---|
| Li, 288 | 10 | 564 | 207-217 | 1,950 | 3.5 | 3.5 | 0 |
| Li, 74 | 7 | 450 | 200 | 100 | 8.5 | 4.1 | 0 |
| Na, 100 | 20 | 564 | 150 | 1,100 | 11.5 | 20.2 | 0 |
| K, 100 | 20 | 564 | 150 | 1,150 | 13 | 73.4 | 21.2 |
| K, 74 | 7 | 446 | 200 | 100 | 1 | 30.6 | 87.0 |
| K, 74 | 7 | 447 | 200 | 600 | 1 | 62.6 | 44.2 |
| Rb, 58 | 20 | 1,128 | 100 | 1,350 | 14 | 15.7 | 9.2 |
| Cs, 26.8 | 10 | 564 | 100 | 1,200 | 14 | 55.2 | 15.8 |

When the above procedure was repeated employing the alumina support in the absence of alkali metal, no observable amount of benzene was converted to products.

Example II

By a procedure similar to that of Example I, a series of runs was conducted employing potassium in the absence of and also in conjunction with a variety of conventional catalyst supports. The results of this series are shown in Table II.

TABLE II

| K, millimoles | Support, g. | Benzene, millimoles | Temp., °C. | Max $H_2$ Press., p.s.i.g. | Time, hrs. | Conversion | Selectivity |
|---|---|---|---|---|---|---|---|
| 100 | None | 564 | 140 | 1200 | 17 | 0 | 0 |
| 100 | $SiO_2$, 20 | 564 | 143 | 1260 | 14 | 10.3 | 0 |
| 25.6 | MgO, 10 | 564 | 100-185 | 1200 | 2.5 | 0 | 0 |
| 74 | $K_2CO_3$, 7.1 | 448 | 200 | 600 | 1 | 0 | 0 |
| 74 | $SiO_2$-$Al_2O_3$, 7.1 | 448 | 200 | 600 | 1 | 1.3 | 54.2 |

Example III

By a procedure similar to that of Example I, a series of runs was conducted employing various supported potassium catalysts of the invention. In the following table wherein the supports are identified by letter, the identity of the support materials is as follows:

Support A: Alumina prepared by hydrolysis of aluminum chloride and calcination at 550° C. for 16 hours.

Support B: Powered alumina which had been calcined at 550° C. for 16 hours.

Support C: Activated F-20 grade alumina which had been calcined for 16 hours at 650° C.

Support D: Activated F-20 grade alumina which had been washed with ammonium nitrate and then water, and subsequently calcined for 16 hours at 550° C.

Support E: Activated charcoal which had been powdered and dried at 120-140° C.

The results of this series are shown in Table III.

TABLE III

| Support, g. | K, millimoles | Benzene, millimoles | Temp., °C. | Max $H_2$ Press., p.s.i.g. | Time, hrs. | Conversion | Selectivity |
|---|---|---|---|---|---|---|---|
| A, 7.1 | 74 | 448 | 200 | 600 | 1 | 34.2 | 69.1 |
| B, 7.1 | 74 | 448 | 200 | 600 | 1 | 51.8 | 49.6 |
| C, 7.1 | 74 | 448 | 200 | 600 | 1 | 65.7 | 33.8 |
| E, 7.1 | 74 | 448 | 200 | 600 | 1 | 11.3 | 74.7 |
| D, 7.1 | 51 | 440 | 224 | 360 | 3 | 40.8 | 84.3 |
| D, 7.1 | 74 | 446 | 200 | 300 | 1 | 30.6 | 87.0 |
| D, 7.1 | 74 | 458 | 200 | 800 | 1 | 61.8 | 43.1 |
| E, 7.1 | 74 | 450 | 225 | 900 | 1 | 30.4 | 81.0 |

I claim as my invention:

1. The process of producing phenylcyclohexane by intimately contacting benzene with molecular hydrogen in the presence of (1) alkali metal catalyst, said catalyst comprising at least one alkali metal of atomic number from 19 to 55 inclusive, and (2) a calcined alumina or activated carbon catalyst support, at a temperature of from about 100° C. to about 250° C. and at a hydrogen pressure of from about 50 p.s.i.g. to about 1500 p.s.i.g.

2. The process of producing phenylcyclohexane by intimately contacting benzene with molecular hydrogen in the presence of (1) from about 0.05 mole to about 0.5 mole per mole of benzene of alkali metal catalyst, said alkali metal being alkali metal of atomic number from 19 to 55 incusive, and (2) a calcined alumina or activated carbon catalyst support, the weight ratio of said support to said catalyst being from about 2:1 to about 20:1 at a temperature of from about 100° C. to about 250° C. and at a hydrogen pressure of from about 50 p.s.i.g. to about 1500 p.s.i.g.

3. The process of claim 2 wherein the alkali metal is potassium.

4. The process of claim 2 wherein the alkali metal is cesium.

5. The process of producing phenylcyclohexane by intimately contacting benzene with molecular hydrogen in the presence of potassium-on-calcined alumina catalyst, the molar ratio of benzene to potassium being from about 10:1 to about 4:1 and the weight ratio of said alumina to potassium being from about 10:1 to about 3:1, at a temperature of from about 150° C. to about 225° C. and a hydrogen pressure of from about 100 p.s.i.g. to about 900 p.s.i.g.

6. The process of producing phenylcyclohexane by intimately contacting benzene with molecular hydrogen in the presence of potassium-on-activated carbon catalyst, the molar ratio of benzene to potassium being from about 10:1 to about 4:1 and the weight ratio of activated carbon to potassium being from about 10:1 to about 3:1, at a temperature of from about 150° C. to about 225° C. and a hydrogen pressure of from about 100 p.s.i.g. to about 900 p.s.i.g.

References Cited
UNITED STATES PATENTS

| | | | |
|---|---|---|---|
| 3,122,593 | 2/1964 | Wilson et al. | 260—667 |
| 3,153,678 | 10/1964 | Logeman et al. | 260—670 X |
| 3,197,520 | 7/1965 | McCall et al. | 260—668 X |

DELBERT E. GANTZ, *Primary Examiner.*

C. R. DAVIS, *Assistant Examiner.*